United States Patent
Rapp et al.

(10) Patent No.: US 10,186,861 B2
(45) Date of Patent: *Jan. 22, 2019

(54) ENERGY STORAGE DEVICE COMPRISING A DC VOLTAGE SUPPLY CIRCUIT AND METHOD FOR PROVIDING A DC VOLTAGE FROM AN ENERGY STORAGE DEVICE

(71) Applicant: Robert Bosch GmbH, Stuttgart (DE)

(72) Inventors: Holger Rapp, Ditzinger (DE); Martin Braun, Neustetten-Wolfenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 411 days.

This patent is subject to a terminal disclaimer.

(21) Appl. No.: 14/901,447

(22) PCT Filed: Jun. 10, 2014

(86) PCT No.: PCT/EP2014/062042
§ 371 (c)(1),
(2) Date: Dec. 28, 2015

(87) PCT Pub. No.: WO2014/206723
PCT Pub. Date: Dec. 31, 2014

(65) Prior Publication Data
US 2016/0211663 A1    Jul. 21, 2016

(30) Foreign Application Priority Data
Jun. 28, 2013    (DE) .................. 10 2013 212 682

(51) Int. Cl.
*H02J 1/00*       (2006.01)
*B60L 11/18*      (2006.01)
*H02J 7/00*       (2006.01)
*H02M 7/483*      (2007.01)

(52) U.S. Cl.
CPC ............ *H02J 1/00* (2013.01); *B60L 11/1855* (2013.01); *B60L 11/1864* (2013.01);
(Continued)

(58) Field of Classification Search
CPC .... H02M 2001/007; H02M 2007/4835; G06F 1/182; G06F 1/20; H02J 1/102;
(Continued)

(56) References Cited

U.S. PATENT DOCUMENTS 5,642,275 A     6/1997  Peng et al.
9,840,159 B2 * 12/2017  Braun ................. B60L 11/1855
(Continued)

FOREIGN PATENT DOCUMENTS

CN     2836311 Y     11/2006
CN   102903983 A      1/2013
(Continued)

OTHER PUBLICATIONS

International Search Report for Application No. PCT/EP2014/062042 dated Sep. 4, 2014 (English Translation, 2 pages).

*Primary Examiner* — Thienvu Tran
*Assistant Examiner* — Brian K Baxter
(74) *Attorney, Agent, or Firm* — Michael Best & Friedrich LLP (57) ABSTRACT

An energy storage device and a DC voltage supply circuit. The energy storage device has at least two energy supply branches connected in parallel. Each of the energy supply branches has a multiplicity of energy storage modules having an energy storage cell module with at least one energy storage cell and a coupling device. The coupling device switches the energy storage cell module selectively into the corresponding energy supply branch or bypasses said energy storage cell module in the energy supply branch. The DC voltage supply circuit has a bridge circuit switchably connected to a first or a second of feed nodes coupled to output connections of the energy storage device.

18 Claims, 5 Drawing Sheets

(52) U.S. Cl.
CPC ......... *H02J 7/0024* (2013.01); *B60L 2210/40* (2013.01); *B60L 2240/527* (2013.01); *B60L 2240/547* (2013.01); *B60L 2240/549* (2013.01); *H02M 2007/4835* (2013.01); *Y02T 10/7005* (2013.01); *Y02T 10/7061* (2013.01); *Y02T 10/7241* (2013.01)

(58) Field of Classification Search
CPC . H02J 3/382; H02J 1/00; H02J 7/0024; B60L 11/1855; B60L 11/1864; B60L 2210/40; B60L 2240/527; B60L 2240/547; B60L 2240/549; Y02T 10/7005; Y02T 10/7061; Y02T 10/7241
USPC .......................................................... 307/77
See application file for complete search history.

(56) References Cited

U.S. PATENT DOCUMENTS

| 2013/0127251 A1 | 5/2013 | Graovac et al. |
| 2013/0249287 A1 | 9/2013 | Feuerstack et al. |

FOREIGN PATENT DOCUMENTS

| DE | 102010027857 | 10/2011 |
| DE | 102010027861 | 10/2011 |
| DE | 102010041040 | 3/2012 |
| DE | 102010041065 | 3/2012 |
| DE | 102011086545 | 5/2013 |
| DE | 102012202853 | 8/2013 |
| DE | 102012202867 | 8/2013 |

* cited by examiner

ENERGY STORAGE DEVICE COMPRISING A DC VOLTAGE SUPPLY CIRCUIT AND METHOD FOR PROVIDING A DC VOLTAGE FROM AN ENERGY STORAGE DEVICE

BACKGROUND OF THE INVENTION

The invention relates to an energy storage device comprising a DC voltage supply circuit as well as to a method for providing a DC voltage from an energy storage device, in particular a battery cycloconverter which supplies a DC voltage to a vehicle electric system.

It is becoming apparent that electronic systems, which combine the new energy storage technologies with an electric drive technology, will be increasingly used in the future for stationary applications, such as, e.g., wind turbines or solar plants, as well as in vehicles, such as hybrid or electric vehicles.

The feed of multi-phase current into an electric machine is usually performed by an inverter in the form of a pulse width modulated inverter. To this end, a DC voltage provided by a DC link can be converted into a multi-phase AC voltage, for example a three phase AC voltage. The DC link is thereby fed by a strand consisting of series-connected battery modules. In order to be able to meet the requirements for power and energy necessary for a respective application, a plurality of battery modules is frequently connected in series in a traction battery.

The series circuit of a plurality of batteries has the problem that the entire strand is rendered useless if a single battery module malfunctions. Such a breakdown of the energy supply strand can lead to a breakdown of the whole system. Furthermore, power reductions in a single battery module occurring temporarily or permanently can lead to power reductions in the entire energy supply system.

A battery system comprising an integrated inverter function is described in the American patent publication U.S. Pat. No. 5,642,275 A1. Systems of this type are known under the name of multilevel cascaded inverters or also battery direct inverters (BDI). Such systems comprise DC sources in a plurality of energy storage module strands which can be directly connected to an electric machine or an electric network. In so doing, single-phase or multi-phase supply voltages can be generated. The energy storage module strands comprise a plurality of series-connected energy storage modules, wherein each energy storage module has at least one battery cell and an associated controllable coupling unit, which enables, as a function of control signals, the at least one battery cell associated in each case therewith to be bypassed or said at least one battery cell associated in each case therewith to be connected into the respective energy storage module strand. In so doing, the coupling unit can be designed in such a manner that said unit additionally enables the at least one battery cell associated in each case therewith to be connected with inverse polarity into the respective energy module strand or enables the energy storage module strand to be interrupted. By suitably actuating the coupling units, e.g. with the help of pulse width modulation, suitable phase signals for controlling the phase output can also be provided so that a separate pulse-controlled inverter can be omitted. The pulse-controlled inverter required for controlling the phase output voltage is thus for all intents and purposes integrated into the BDI.

In comparison with conventional systems, BDIs usually have a higher degree of efficiency, a greater reliability and a significantly lower harmonic content of the output voltage thereof. The reliability is inter alia ensured by virtue of the fact that defective, failed or inefficient battery cells can be bypassed in the energy supply strands by means of a suitable actuation of the coupling units associated therewith. The phase output voltage of an energy storage module strand can be varied by a corresponding actuation of the coupling units and, in particular, adjusted in a stepped manner. The stepped adjustment of the output voltage thereby results from the voltage of a single energy storage module, wherein the maximum possible phase output voltage is determined by the sum of the voltages of all of the energy storage modules of an energy storage module strand.

The German patent publications DE 10 2010 027 857 A1 and DE 10 2010 027 861 A1 disclose, for example, battery direct inverters comprising a plurality of battery module strands which can be directly connected to an electric machine.

A constant DC voltage is not available at the output of BDIs because the energy storage cells are allocated to different energy storage modules and the coupling devices thereof have to be selectively actuated in order to generate a voltage level. As a result of this allocation of the energy storage cells, a BDI can basically not be used as a DC voltage source, for example, for supplying electricity to an electrical system of an electric vehicle. Accordingly, the charging of the energy storage cells is not readily possible via a conventional DC voltage source.

There is therefore a need for an energy storage device comprising a DC voltage supply circuit and a method for operating the same, with which a DC voltage consumer can be supplied with a DC voltage from the energy storage device or, respectively, a DC voltage charging circuit can be coupled to an energy storage device.

SUMMARY OF THE INVENTION

According to one aspect, the present invention provides a system comprising an energy storage device and a DC voltage supply circuit, wherein the energy storage device has at least two energy supply branches which are each coupled, at a first output, to at least one output connection of the energy storage device for generating an AC voltage at the output connections and, at a second output, to a common busbar, wherein each of the energy supply branches has a multiplicity of energy storage modules connected in series. The energy storage modules each comprise an energy storage cell module, which has at least one energy storage cell, and a coupling device comprising a coupling bridge circuit comprising coupling elements, wherein the coupling elements are designed to switch the energy storage cell module selectively into the corresponding energy supply branch or to bypass said energy storage cell module in the energy supply branch. The DC voltage supply circuit has a bridge circuit comprising a multiplicity of first feed connections, which are each coupled to one of the output connections of the energy storage device, two feed nodes, of which at least one is coupled to the bridge circuit, and a module tap circuit, which has at least two module switching branches comprising a commutation diode, wherein one of the module switching branches connects a first input connection of the energy storage cell module of at least one energy storage module of one of the energy supply branches switchably to a first of the feed nodes, and another of the module switching branches connects a second input connection of the energy storage module of the at least one energy storage module switchably to a second of the feed nodes.

According to a further aspect, the present invention establishes a method for providing a DC voltage from an inventive system according to the first aspect, comprising the steps of ascertaining the output voltage of the energy supply branches at the output connections of the energy storage device, and of switchably coupling the first input connection of the energy storage cell module of at least one energy storage cell module of one of the energy supply branches to the second feed node, in the event that the ascertained output voltage is less than the maximum output voltage of a single energy storage module.

The concept of the present invention is to provide a circuit for the outputs of a modularly designed energy storage device, in particular a battery direct inverter, with which a DC voltage for the operation of a DC voltage consumer, for example a DC-to-DC converter of an electrical system of an electrically driven vehicle, can be provided during the operation of the energy storage device for the actuation of an electric machine. To this end, provision is made for a diode bridge circuit to be coupled to the output connections of the energy storage device, with the aid of which circuit a direct voltage at the output connections can be tapped. At the same time, a module tap circuit is used to discharge a DC voltage selectively out of an individual energy storage module to the DC voltage consumer.

It is thereby very advantageous if a further DC voltage level is always present, for example for feeding an intermediate circuit capacitor of the on-board electrical system from the energy storage device, regardless in which operating state the energy storage device is currently being operated. Particularly when the entire output voltage of the energy storage device is low, which is less than the output voltage of an individual energy storage module, the module tap circuit can be used to tap an input voltage of an individual energy storage module and to feed said input voltage selectively into the DC voltage consumer.

A further advantage of this module tap circuit is that a charging circuit, for example from a range extender in an electrically operated vehicle, can be coupled in series to the DC voltage consumer; and energy for charging the energy storage cells can also be fed at least into the energy storage modules coupled via the module tap circuit during the supply operation of the energy storage device.

According to one embodiment of the system according to the invention, at least one of the at least one module switching branches can have, in addition to the commutation diode, a module coupling switch that is connected in series with said commutation diode.

According to a further embodiment of the system according to the invention, the system can further comprise a DC-to-DC converter, which is coupled between the first feed node and the second feed node. According to one embodiment, the DC-to-DC converter can thereby have a boost converter or a forward converter.

According to a further embodiment of the of the system according to the invention, the DC voltage supply circuit can have two charging circuit connections and a charging circuit, which is coupled in series via the two charging circuit connections to the DC-to-DC converter or directly to the feed nodes, the charging circuit being designed to provide a charging DC voltage for the energy storage cell modules of the energy storage device.

According to a further embodiment of the system according to the invention, the bridge circuit can have a multiplicity of first bridge circuit branches comprising a diode or the series circuit consisting of a diode and a bridge coupling switch, which each are coupled between the feed nodes connected to the bridge circuit and one of the multiplicity of first feed connections or the multiplicity of second feed connections.

According to a further embodiment of the system according to the invention, the bridge circuit can have a further first feed connection or a further second feed connection, which is connected to the busbar.

According to a further embodiment of the system according to the invention, the bridge circuit can have a multiplicity of first feed connections as well as a multiplicity of second feed connections, which are coupled in each case to one of the output connections or to the busbar of the energy storage device.

According to a further embodiment of the system according to the invention, the bridge circuit can have a further bridge switching branch which connects the further first feed connection or the further second feed connection to that node of the two feed nodes which is connected via the bridge circuit to the first feed connections or to the second feed connections.

According to a further embodiment of the system according to the invention, the bridge circuit can have a multiplicity of first bridge switching branches and a multiplicity of second bridge switching branches each comprising a diode or a series circuit consisting of a diode and a bridge coupling switch, wherein the first bridge switching branches are connected in each case between one of the multiplicity of first feed connections and the first feed node; and the second bridge switching nodes are connected in each case between one of the multiplicity of the second feed connections and the second feed node.

According to a further embodiment of the system according to the invention, the module switching branches can switchably connect the energy storage cell module of the energy storage module of the energy supply branches, which energy storage module is in closest proximity to the busbar, to the first or second feed nodes.

According to a further embodiment of the system according to the invention, the system can furthermore comprise a n-phase electric machine having n phase connections, which machine is coupled to the output connections of the energy storage device, wherein n≥1.

According to a further embodiment of the invention, the n-phase electric machine can have a winding neutral point which is fed out of the machine. In addition, this winding neutral point can be connected to the busbar of the energy storage device. This is particularly advantageous with two-phase machines (n=2).

BRIEF DESCRIPTION OF THE DRAWINGS

Further features and advantages of embodiments of the invention ensue from the following description with reference to the attached drawings.

In the drawings.

DETAILED DESCRIPTION

Figure 1:
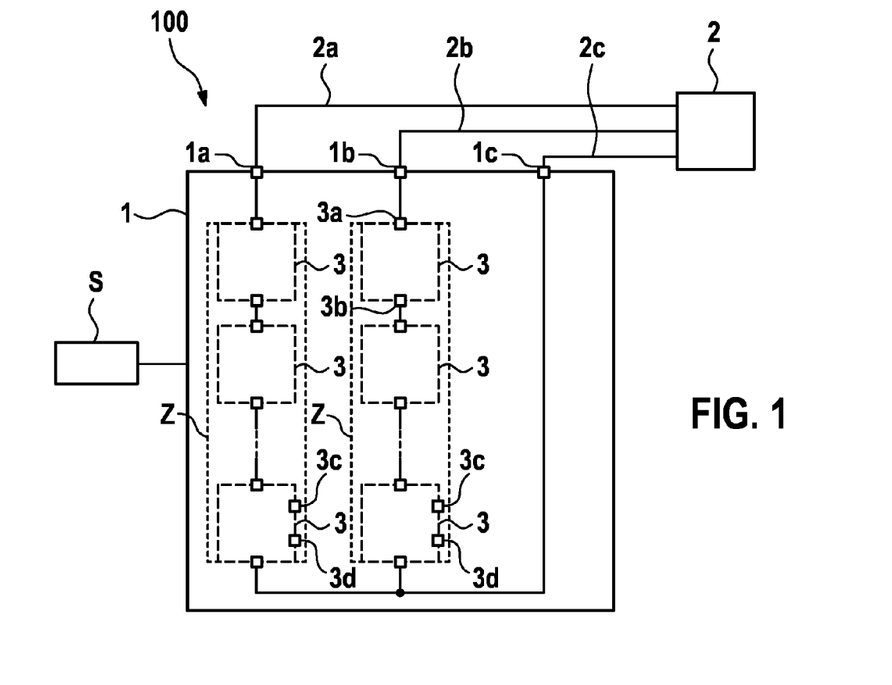
FIG. 1 shows a schematic depiction of a system comprising an energy storage device.

FIG. 1 shows a schematic depiction of a system 100 comprising an energy storage device 1 for the voltage conversion of DC voltage provided in energy storage modules 3 into n-phase AC voltage. The energy storage device 1 comprises a multiplicity of energy supply branches Z, of which two are shown by way of example in FIG. 1, which are suitable for generating a two-phase AC voltage, for example for a transverse flux machine 2. It is, however, clear that each other number of energy supply branches Z are likewise possible. The energy supply branches Z can have a multiplicity of energy storage modules 3 which are connected in series in the energy supply branches Z. By way of example, three energy storage modules 3 are shown in each case per energy supply branch Z in FIG. 1, wherein any other number of energy storage modules 3 is, however, likewise possible. The energy storage device 1 has an output connection 1a and 1b, which are each connected to phase lines 2a and 2b, available at each of the energy supply branches Z. In the example in FIG. 1, the phase line 2c of the electric machine 2 is connected directly via the neutral point of the machine 2 to a busbar 2c which is coupled in turn to input connections, preferably to the neutral point, of the energy supply branches Z. It may, however, also be possible, not to couple the electric machine 2 back to the energy storage device 1 via a phase line 2c. This option can be selected depending on the type and design of the electric machine 2.

The system 100 can further comprise a control device S which is connected to the energy storage device 1 and with the aid of which the energy storage device 1 can be controlled in order to provide the desired output voltages at the respective output connections 1a, 1b or 1c.

The energy storage modules 3 each have two output connections 3a and 3b, via which an output voltage of the energy storage modules 3 can be provided. Because the energy storage modules 3 are primarily connected in series, the output voltages of the energy storage modules 3 add up to a total output voltage which can be provided at the relevant output connection of the output connections 1a, 1b or 1c of the energy storage device 1.

Figure 2:
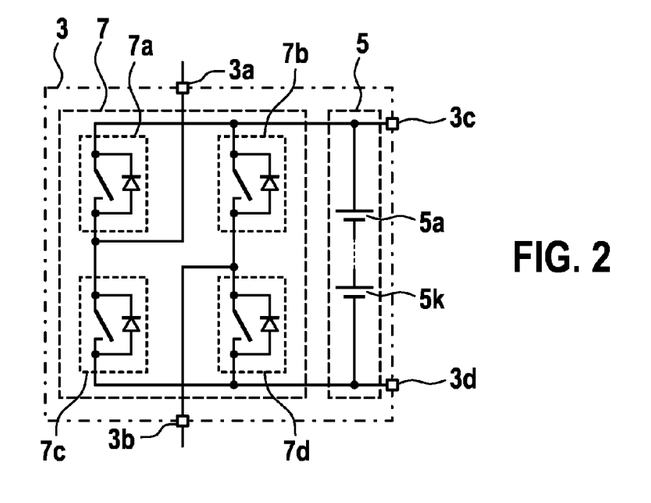
FIG. 2 shows a schematic depiction of an energy storage module of an energy storage device.

Exemplary embodiments of the energy storage modules 3 are shown in FIG. 2 in greater detail. In the embodiments, the energy storage modules 3 each comprise a coupling device 7 comprising a plurality of coupling elements 7a, 7b, 7c and 7d. The energy storage modules 3 each furthermore include an energy storage cell module 5 comprising one or a plurality of energy storage cells 5a to 5k that are connected in series.

Figure 3:
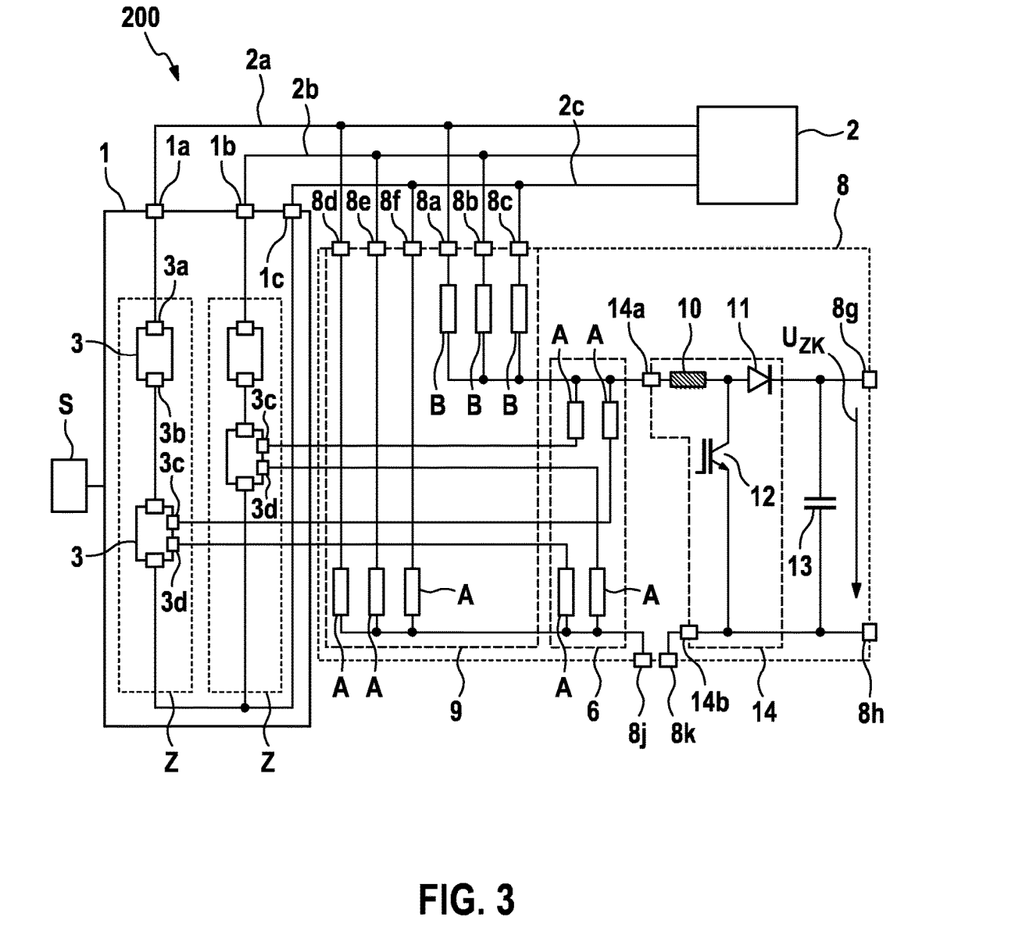
FIG. 3 shows a schematic depiction of a system comprising an energy storage device and a DC voltage supply circuit according to one embodiment of the invention.

The energy storage cell module 5 can thereby have, for example, energy storage cells 5a to 5k, for example lithium-ion cells, that are connected in series. The number of the energy storage cells 5a to 5k in the energy storage modules 3 shown in FIGS. 2 and 3 is two by way of example, wherein, however, any other number of energy storage cells 5a to 5k is likewise possible.

The energy storage cell modules 5 are connected via connection lines to input connections of the associated coupling device 7. By way of example, the coupling device 7 is designed in FIG. 2 as a full bridge circuit comprising respectively two coupling elements 7a, 7c and two coupling elements 7b, 7d. The coupling elements 7a, 7b, 7c, 7d can each have an active switching element, for example a semiconductor switch, and a free-wheeling diode connected in parallel thereto. Provision can thereby be made for the coupling elements 7a, 7b, 7c, 7d to be designed as MOSFET switches, which already comprise an intrinsic diode, or as IGBT switches.

The coupling elements 7a, 7b, 7c, 7d can be actuated in such a manner, for example with the aid of the control device S depicted in FIG. 1, that the respective energy storage cell module 5 is switched selectively between the output connections 3a and 3b or that said storage cell module 5 is bypassed. In reference to FIG. 2, the energy storage cell module 5 can, for example, be switched in the forward direction between the output connections 3a and 3b by the active switching element of the coupling element 7d and the active switching element of the coupling element 7a being moved into a closed state, whereas the two remaining active switching elements of the coupling elements 7b and 7c are moved into an open state. A bypassing state can, for example, be set as a result of the two active switching elements of the coupling elements 7a and 7b being moved into the closed state, while the two active switching elements of the coupling elements 7c and 7d are held in the open state. A second bypassing state can be set as a result of the two active switching elements of the coupling elements 7a and 7b being held in the open state, while the two active switching elements of the coupling elements 7c and 7d are moved into the closed state. Finally, the energy storage cell module 5 can, for example, be switched in the reverse direction between the output connections 3a and 3b by the active switching element of the coupling element 7b and the active switching element of the coupling element 7c being moved into a closed state, while the two remaining active switching elements of the coupling elements 7a and 7d are moved into an open state. By suitably actuating the coupling devices 7, individual energy storage cell modules 5 of the energy storage modules 3 can therefore be integrated into the series circuit of an energy supply branch Z in a targeted manner and with any polarity.

In addition, the energy storage modules 3 can each comprise interfaces 3c and 3d, which each are coupled to input connections of the energy storage cell module 5. For the energy storage device 1 in FIG. 1, partial energy storage modules 3 comprising such interfaces 3c and 3d and partial energy storage modules 3 without the interfaces 3c and 3d can, for example, be disposed in an energy supply branch Z. In so doing, the proportion of the energy storage modules 3 comprising interfaces 3c and 3d can be freely selected and can particularly be adapted to the requirements of the energy storage device 1, as is more precisely explained further below in conjunction with FIGS. 3 to 5.

The system 100 in FIG. 1 is used by way of example to feed a two-phase electric machine 2, for example in an electrical drive system for an electrically operated vehicle.

Provision can, however, also be made for the energy storage device 1 to be used to generate electrical current for an energy supply network 2. The energy supply branches Z can be connected to a busbar 2c (reference potential bus) at the end thereof connected to the neutral point. The potential of the ends of the energy supply branches Z connected to a neutral point can also by definition be set as the reference potential without being further connected to a reference potential located outside of the energy supply device 1.

In order to generate a phase voltage between the output connections 1a and 1b on the one hand and the busbar 2c on the other hand, only a portion of the energy storage cell module 5 of the energy storage modules 3 is usually required. The coupling devices 7 of which can be actuated in such a manner that the total output voltage of an energy supply branch Z can be set in a stepped manner in a rectangular voltage/current adjustment range between the negative voltage of an individual energy storage cell module 5 which is multiplied by the number of the energy storage modules 3 and the positive voltage of an individual energy storage cell module 5 which is multiplied by the number of the energy storage modules 3 on the one hand and between the negative and the positive nominal current through an individual energy storage module 3 on the other hand.

Such an energy storage device 1 as shown in FIG. 1 has different potentials at the output connections 1a, 1b at different points in time during operation and can therefore not be readily used as a DC voltage source. Particularly in electrical drive systems of electrically operated vehicles, it is often desirable to feed the on-board power supply of the vehicle, for example a high voltage on-board power supply or a low voltage on-board power supply, from the energy storage device 1. A DC voltage supply circuit is therefore provided which is designed to be connected to an energy storage device 1 and, being fed by the same, to provide a DC voltage, for example, for the on-board power supply of an electrically operated vehicle.

FIG. 3 shows a schematic depiction of a system 200 comprising an energy storage device 1 and such a DC voltage supply circuit 8. The DC voltage supply circuit 8 is coupled to the energy storage device 1, on the one hand, via first bus terminals 8a, 8b and 8c and, on the other hand, via second bus terminals 8d, 8e and 8f A DC voltage $U_{ZK}$ of the DC voltage supply circuit 8 can be tapped at tap connections 8g and 8h. A further DC voltage converter (not depicted) for an on-board power supply of an electrically operated vehicle can, for example, be connected to the tap connections 8g and 8h or said voltage converter can—if a suitable equalization between the voltage $U_{ZK}$ between the tap connections 8g and 8h and the on-board power supply voltage exists—be directly connected to said on-board power supply.

In the example of FIG. 3, the DC voltage supply circuit 8 has a full bridge circuit 9 which is coupled via the first and second bus terminals 8a to 8f in each case to one of the output connections 1a, 1b, 1c of the energy storage device 1. The bus terminals 8a to 8f can, for example, be coupled to the phase lines 2a, 2b or to the busbar 2c of the system 200. The full bridge circuit 9 can have bridge switching branches A, which are shown by way of example in greater detail in FIG. 6. In so doing, the pole notations "+" and "−" of the bridge switching branch A depicted in FIG. 6 correspond to the pole notations "+" and "−" of the elements A depicted in FIG. 3 (and subsequently also in the FIGS. 4 and 5), i.e. the input connection of the bridge switching branch A in FIG. 6 that is denoted with "+" corresponds to the input connections of the elements A in FIGS. 3 to 5 denoted with "+"; and the input connection of the bridge switching branch A in FIG. 6 that is denoted with "−" corresponds to the input connections of the elements A in FIGS. 3 to 5 that are denoted with "−". The pole of a bridge switching branch switch that is denoted with "+" is designated below as the anode thereof and the pole denoted with "−" is correspondingly designated as the cathode thereof.

Figure 6:
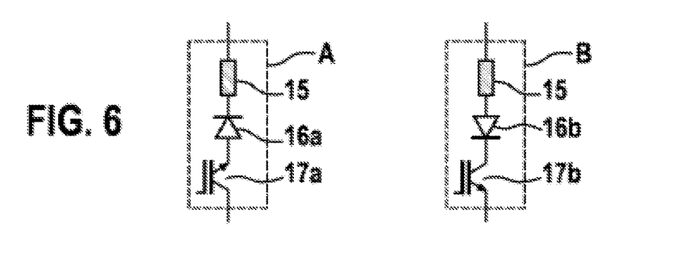
FIG. 6 shows a schematic depiction of a module switching branch or, respectively, a bridge switching branch for a DC voltage supply circuit according to a further embodiment of the invention.

As is shown in FIG. 6, the bridge switching branches A can each comprise a series circuit consisting in each case of a commutation diode 16 and an active bridge coupling switch 17. The arrangement of the commutation diode 16 and the bridge coupling switch 17 within a bridge switching branch is interchangeable. The bridge coupling switch 17 can thereby comprise, for example, MOSFET or IGBT power semiconductor switches. The bridge switching branches A are disposed such that the bus terminals 8a, 8b, 8c couple the anodes of the bridge switching branches A connected thereto to the phase lines 2a, 2b respectively 2c and such that the bus terminals 8d, 8e, 8f couple the cathodes of the bridge switching branches connected thereto to the phase lines 2a, 2b respectively 2c. The cathodes of the bridge switching branches coupled by the bus terminals 8a, 8b, 8c can themselves be connected together at a common cathode collecting point of the full bridge circuit 9, whereas the anodes of the bridge switching branches A coupled by the bus terminals 8d, 8e, 8f are connected together at a common anode collecting point of the full bridge circuit 9. The cathode collecting point is in turn connected to the first feed node 14a. The anode collecting point is connected to the second feed node 14b.

As a result of this type of wiring, the currently highest potential of the phase lines 2a, 2b or, respectively, the busbar 2c is applied in each case to the cathode collecting point of the full bridge circuit 9 and therefore to the feed node 14a when the bridge coupling switches 17 are closed in each case. Furthermore, the currently lowest potential of the phase lines 2a, 2b or, respectively, the bus bar 2c is applied in each case to the anode collecting point of the full bridge circuit 9 and therefore to the feed node 14b. In addition, a commutation choke 15 can be optionally provided in each of the bridge switching branches A, said commutation choke being coupled in each case in series with the diodes 16 and the bridge coupling switches 17. The commutation choke 15 can thereby be arranged within the series circuit consisting of commutation diode 16, bridge coupling switch 17 and commutation choke 15 in an arbitrary manner. The commutation chokes 15 can thus buffer potential fluctuations which can periodically occur due to actuation-related, stepped potential alterations in the respective phase lines 2a, 2b, so that the diodes 16 are loaded to a lesser degree as a result of frequent commutation processes.

If the DC voltage supply circuit is only used to remove energy from the energy storage device 1, for example for supplying an on-board power supply, the active bridge coupling switches 17 can be omitted. In this case, said active bridge coupling switches 17 are replaced by a conductive connection. If energy is also to be able to be fed into the energy storage device 1 via the DC voltage supply circuit 8, the active bridge coupling switches 17 are then required.

The DC voltage supply circuit 8 further comprises a module tap circuit 6 which comprises at least two module switching branches A. In the present exemplary embodiment, four module switching branches A are provided. The module switching branches A can be constructed analogously to the bridge switching branches A in FIG. 6, wherein the pole notations "+" and "−" of the bridge switching branches A in FIG. 6 correspond in turn to the pole notations "+" and "−" of the module switching branches A in FIGS. 3 to 5. One of the module switching branches A thereby switchably connects a first input connection 3c of the energy storage cell module 5 of at least one energy storage modules 3 of one of the energy supply branches Z to the cathode collecting point of the DC voltage supply circuit 8, and another of the module switching branches A switchably connects a second input connection 3d of the energy storage cell module 5 of the at least one energy storage module 3 to the anode collecting point of the DC voltage supply circuit 8. The cathode collecting point and the anode collecting point can then be coupled to feed nodes 14a or 14b of a DC voltage input stage 14.

According to the invention, the module tap circuit 6 contains at least two of the four module switching branches A depicted in the exemplary embodiment according to FIG. 3. Embodiments of the module tap circuit 6 are also likewise possible, in which further energy storage modules 3 of the energy storage device 1 have corresponding input connections at their disposal and are connected via module switching branches A to the first feed node 14a and/or to the second feed node 14b of a DC voltage input stage 14. As a result, the module switching branches A connected to the feed node 14a are constantly connected to the cathode thereof at this feed node 14a, and the module switching branches A connected to the feed node 14b are constantly connected to the anode thereof at this feed node 14b.

A potential difference, which can be boosted by the DC voltage input stage 14—in the example of FIG. 3 a boost converter—therefore exists between the collecting points of the full bridge circuit 9 and the module tap circuit 6. The boost converter 14 can thereby be designed to provide a DC voltage $U_{ZK}$ at the tap connections 8g, 8h of the DC voltage supply circuit 8 as a function of the potential between the collecting points of the full bridge circuit 9 and the module tap circuit 6. At the first feed node 14a, the boost converter 14 can, for example, have a converter choke 10 and an output diode 11 in a series circuit, the central point tap of which couples an actuator switching element 12 to the second feed node 14b. The converter choke 10 can also alternatively be provided between the anode collecting point and the actuator switching element 12, or two converter chokes 10 can be provided at both input connections of the boost converter 14.

The actuator switching element 12 can, for example, have a power semiconductor switch, such as, for example, a MOSFET switch or an IGBT switch. An N-channel IGBT can, for example, be used for the actuator switching element 12 which is disabled in the normal state. It should, however, be clear in this regard that any other power semiconductor switch can likewise be used for the actuator switching element 12.

There is the option of omitting the actuator switching element or of leaving the actuator switching element 12 in a permanently disabled state, in particular then if the potential difference between the cathode and anode collecting points always lies within an input voltage range which is predetermined by a further component that is connected to the tap connections 8g, 8h. In this case, the output diode 11 can also be omitted in some embodiments.

The DC voltage supply circuit 8 can furthermore have an intermediate circuit capacitor 13 which is connected between the tap connections 8g, 8h of the DC voltage supply circuit 8 and which is designed to buffer the current pulses emitted by the boost converter 14 and thus generate a smoothed DC voltage $U_{ZK}$ at the output of the boost converter 14. A DC-voltage converter of an on-board power supply of an electrically operated vehicle can then, for example, be fed by means of the intermediate circuit capacitor 13; or this on-board power supply can in certain cases also be directly connected to the intermediate circuit capacitor 13.

Figure 4:
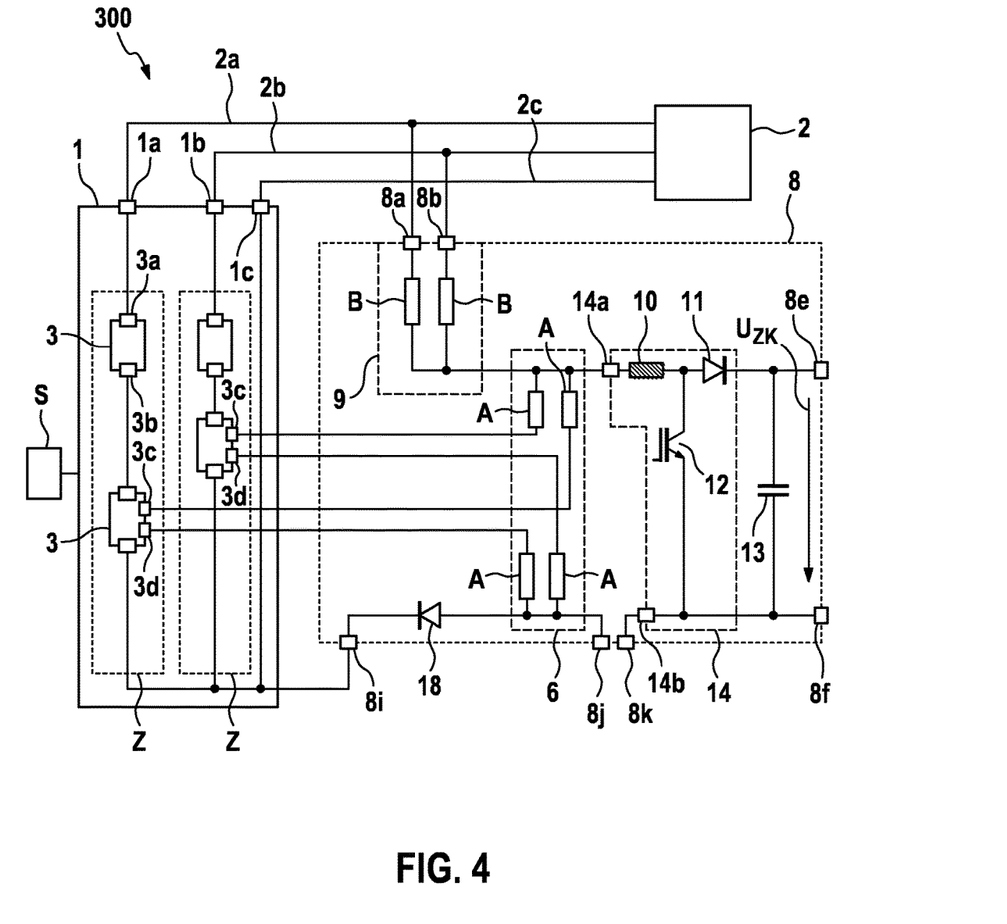
FIG. 4 shows a schematic depiction of a system comprising an energy storage device and a DC voltage supply circuit according to a further embodiment of the present invention.
Figure 5:
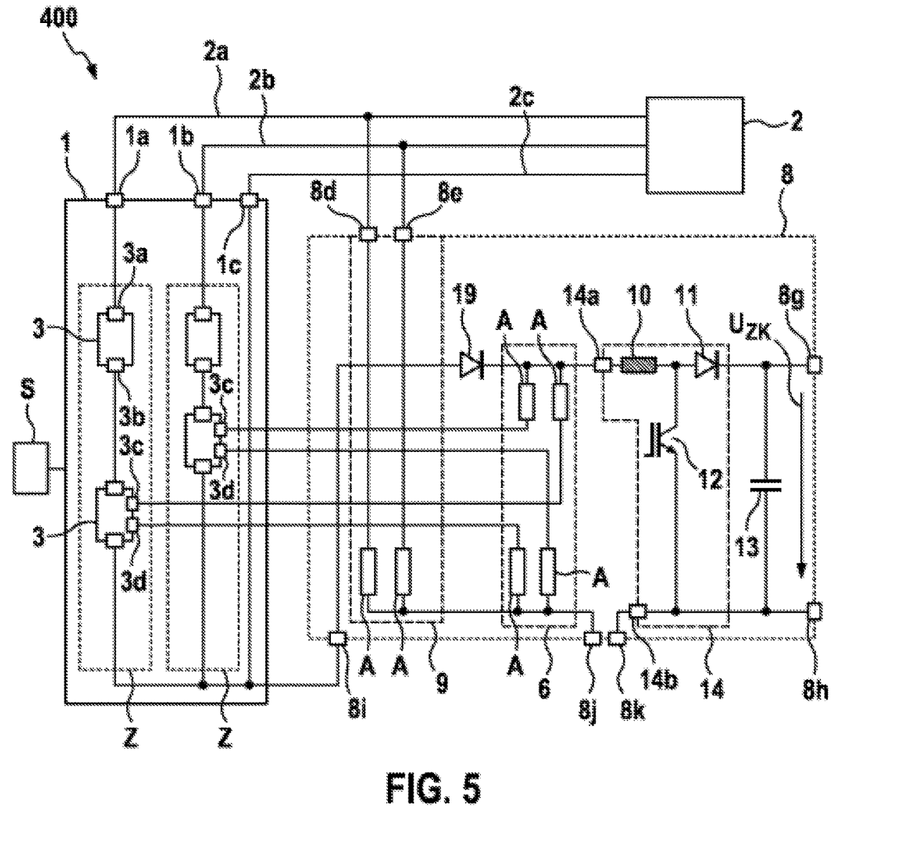
FIG. 5 shows a schematic depiction of a system comprising an energy storage device and a DC voltage supply circuit according to a further embodiment of the present invention.

The DC voltage input stage 14 can, by way of example, be differently depicted than in the FIGS. 3 to 5 and also be implemented by means of another DC voltage converter, for example a forward converter in a half-bridge circuit or in a full bridge circuit.

The number of the bridge switching branches A in the bridge circuit 9 is in each case in FIG. 3 specified as six and is adapted to the number of output connections 1a, 1b, 1c of the energy storage device 1. It should be clear in this regard that any other number of bridge switching branches A is likewise possible, depending on which phase voltages are generated by the energy storage device 1.

Similarly, the module tap circuit 8 can likewise have more than respectively 2 module switching branches A, in particular if not only one of the energy storage modules 3 is coupled via the connections 3c and 3d to the module tap circuit 6. Provision can likewise be made for one of the energy storage modules 3 not to be coupled to the module tap circuit 6 in all of the energy supply branches Z but only in one or in some energy supply branches Z. The particular energy storage module 3 of an energy supply branch Z of the energy storage device 1 which module lies in the closest proximity to the busbar 2c is preferably coupled in each case to the module tap circuit 6. As a result, the reference potential can always be exactly determined at the anode collecting point.

The DC voltage supply circuit 8 can furthermore optionally have two charging circuit connections 8j and 8k, via which a charging circuit is connected which is coupled in series via the two charging circuit connections 8j and 8k to the DC voltage converter and which is designed to provide a charging DC voltage to the energy storage cell modules 5 of the energy storage device 1. If a charging circuit is not provided at this location, the charging circuit connections 8j and 8k are then conductively connected to one another.

Figure 8:
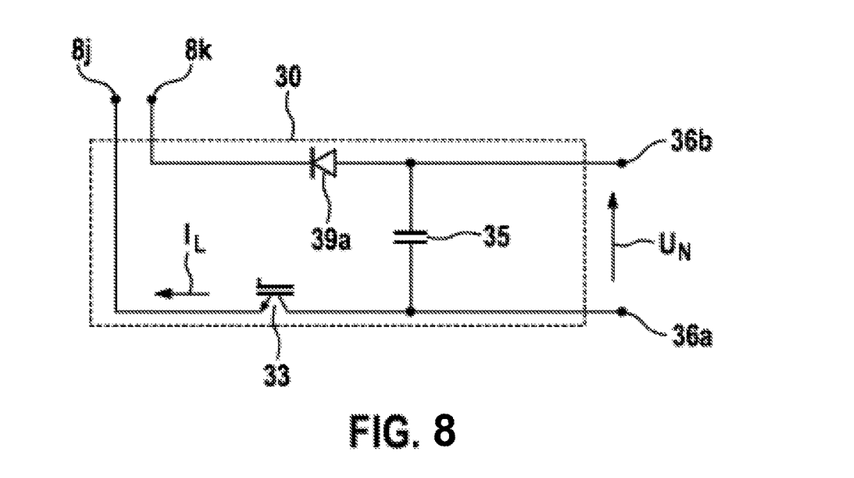
FIG. 8 shows a schematic depiction of a charging circuit for a system according to one of the FIGS. 3 to 5 according to a further embodiment of the present invention.
Figure 9:
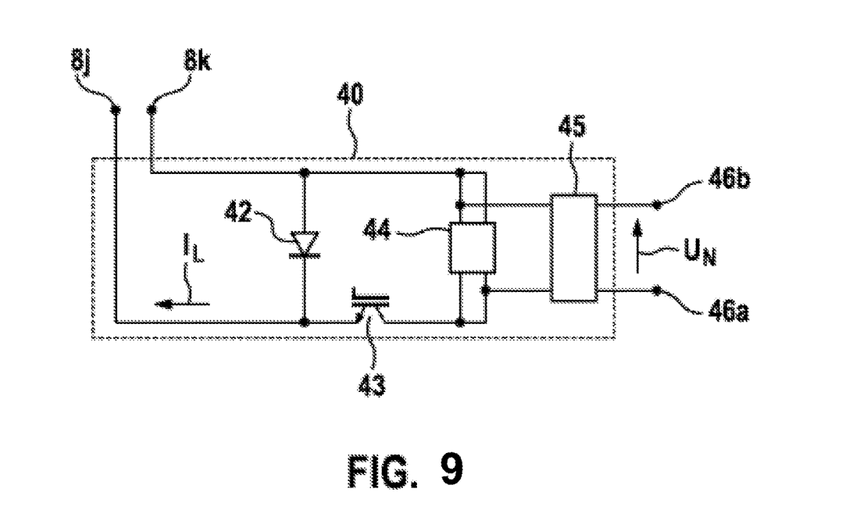
FIG. 9 shows a schematic depiction of a further charging circuit for a system according to one of the FIGS. 3 to 5 according to a further embodiment of the present invention.

The FIGS. 8 and 9 show schematic depictions of charging circuits 30 respectively 40, which, for example, can be used to charge one or a plurality of energy supply branches Z of an energy storage device 1 and can particularly be used to feed the charging circuit connections 8j and 8k.

FIG. 8 shows a schematic depiction of a charging circuit 30 which comprises input connections 36a, 36b at which an input DC voltage $U_N$ can be fed. The input DC voltage $U_N$ can thereby be generated by circuit arrangements, which are not depicted, for example: DC voltage converters, open-loop or closed-loop controlled rectifiers having a power factor correction (PFC) or the like. The input DC voltage $U_N$ can, for example, be provided by an energy supply network connected on the input side or by a range extender. The charging circuit 30 can furthermore comprise an input capacitor 35, via which the input DC voltage can be tapped and which substantially reduces the retroaction of pulsating currents on the input side as well as the output side of the charging circuit 30 or the retroaction of switching processes in the charging circuit 30 itself on the input DC voltage $U_N$. An output voltage $U_L$ of the charging circuit 30 can be tapped at the charging circuit connections 8j and 8k of the charging circuit 30, said output voltage being used to charge a connected energy storage device, for example a series of energy storage modules 3 or an energy supply branch Z of an energy storage device 1, as is shown in FIGS. 3 to 5.

The charging circuit 30 comprises a semiconductor switch 33 and a free-wheeling diode 39, which implement a buck converter. The output voltage of the energy storage device 1 to be charged, for example a series of energy storage modules 3 or an energy supply branch of the energy storage device 1 as depicted in FIGS. 3 to 5, or alternatively the duty cycle of the buck converter implemented via the semiconductor switch 33 can, for example, be used as the manipulated variable for the charging current $I_L$. It can also be possible to use the input DC voltage $U_N$ applied across the input capacitor 35 as the manipulated variable for the charging current $I_L$. The buck converter can, for example, also be operated in an operating state with the constant duty cycle of 1 so that the semiconductor switch 33 can stay permanently closed. It may also thereby be possible to omit the semiconductor switch 33 and to replace the same with a conductive connection.

FIG. 9 shows a schematic depiction of a charging circuit 40 which has output connections 46a, 46b, whereat an input AC voltage $U_N$ can be fed. In so doing, the input AC voltage $U_N$ can be generated by switching arrangements, which are not depicted, for example inverter full bridges or something similar. The input AC voltage $U_N$ preferably has a rectangular intermittent or continuous profile and a high base frequency. The input AC voltage $U_N$ can, for example, be provided by an energy supply network connected on the input side or a range extender comprising a downstream inverter or converter bridge. The charging circuit 40 can furthermore have a transformer 45, the primary winding of which is coupled to the input connections 46a, 46b. The secondary winding of the transformer 45 can be coupled to a full bridge rectifier circuit 44 consisting of four diodes and on the output of which a pulsating DC voltage can be tapped. A variation of the interval length of the pulsating DC voltage can result by varying the time intervals in which the input AC voltage $U_N$ applied to the primary winding of the transformer 45 and therefore also the corresponding secondary voltage at the secondary winding of the transformer 45 have the instantaneous value of 0. An output voltage $U_L$ of the charging circuit 40 can be tapped at the charging circuit connections 8j, 8k of the charging circuit 40, wherein said output voltage $U_L$ can be used to charge, for example, a series of energy storage modules 5 or an energy supply branch Z of an energy supply device 1 as is depicted in FIGS. 3 to 5.

The charging circuit 40 comprises a free-wheeling diode 42 and a semiconductor switch 43, which are used as a buck converter for the pulsating DC voltage of the full bridge rectifier circuit 44. Provision can thereby also be made for a converter choke 41 for smoothing the charging current $I_L$ to be integrated into the charging circuit 40. The function of such a converter choke 41 can, however, also be implemented by means of a converter choke 10 present in the DC voltage supply circuit 8 because the input of the DC voltage supply circuit 8 and the output of the charging circuit 30 or, respectively, 40 are connected electrically in series. The output voltage of the energy storage modules 3 to be charged of one or a plurality of energy supply branches Z of the energy storage device 1, as depicted in the FIGS. 3 to 5, and/or alternatively the steady component of the pulsating DC voltage at the output of the full bridge rectifier 44 and/or the relative duty cycle of the semiconductor switch 43 can be used as the manipulated variable for the charging current $I_L$.

In a further embodiment, the semiconductor switch 43 can be omitted without substitution, and said semiconductor switch can be replaced by a conductive connection. In this case, the pulsating output voltage of the full bridge rectifier 44 is directly applied to the charging circuit connections 8a, 8b and therefore constitutes the charging voltage $U_L$.

In a modification to the aforementioned further embodiment, the free-wheeling diode 42 can be omitted without substitution. In this case, the diodes of the full bridge rectifier circuit 44 additionally take on the function of the free-wheeling diode 42. As a result, a component is saved; however, the efficiency of the charging circuit 40 is in turn reduced.

Using the energy storage device 1 and the DC voltage supply circuit 8 in FIG. 3, the module tap circuit 6 can be activated by the corresponding module coupling switches 17 of the module switching branches A being closed at an operating point of the electric machine 2 which requires a small amount of machine voltage, for example at a low driving speed or a resting state of an electrically operated vehicle. It is thereby ensured that the output voltage of the module tap circuit 6 cannot fall below the voltage of an individual energy storage module 3. In the charging mode, i.e. when the charging circuit 30 or, respectively, 40 is activated in the so-called range extender mode, module coupling switches 17 of the module switching branches A or, respectively, the bridge switching branches A can be disabled; thus enabling the output voltage of the module tap circuit 6 to also be negative.

FIG. 4 shows a schematic depiction of a system 300 comprising an energy storage device 1 and a DC voltage supply circuit 8. The system 300 differs from the system 200 shown in FIG. 3 substantially due to the fact that the bridge circuit 9 is designed as a half-bridge circuit comprising a cathode collecting point. This means that only the phase tap connections 8a, 8b of the energy storage device 1 are provided, via which bridge switching branches A are connected to the phase lines 2a, 2b of the energy storage device 1. In the DC voltage supply circuit 8 of FIG. 4, the potential, which in each case is currently highest, of the phase lines 2a, 2b or, respectively, of the input connections 3c of energy storage modules 3 of the energy storage device 1, which are coupled via module switching branches A to a cathode collecting point, is therefore continually applied to said cathode collecting point of the half-bridge circuit 9. Said cathode collecting point is in turn connected to the first feed node 14a. The second feed node 14b is in contrast coupled to the busbar 2c of the energy storage device 1. There is also a potential difference between the cathode collecting point of the half-bridge circuit 9 and hence the feed node 14a and the feed node 14b, which can be boosted to a DC voltage $U_{ZK}$ by means of the boost converter 14, in the DC voltage supply circuit 8 of FIG. 4. The feed node 14b is connected via a diode 18 to the busbar 2c or the neutral point connection of the electric machine 2 so that an undesirable short circuit cannot develop across the module switching branches A within the energy storage device 1. As a result, the potential, which in each case is currently lowest, of the busbar 2c or, respectively, of the input connections 3d of energy storage modules 3 of the energy storage device 1, which are coupled via module switching branches A to said feed node 14b, is applied to the feed node 14b of the DC voltage supply circuit 8 of FIG. 4.

In a similar manner, FIG. 5 shows a schematic depiction of a system 400 comprising an energy storage device 1 and a DC voltage supply circuit 8. The system 400 differs from the system shown in FIG. 3 substantially due to the fact that the bridge circuit 9 is designed as a half-bridge circuit comprising an anode collecting point. That means that only the phase tap connections 8d and 8e are provided, via which bridge switching branches A are connected to the phase lines 2a, 2b of the energy storage device 1. In the DC voltage supply circuit 8 of FIG. 5, the potential, which in each case is currently lowest, of the phase lines 2a, 2b or, respectively, of the input connections 3d of energy storage modules 3 of the energy storage device 1, which are coupled via module switching branches A to an anode collecting point, is therefore continually applied to said anode collecting point of the half-bridge circuit 9. Said anode collecting point is in turn connected to the second feed node 14b. In this embodiment, the first feed node 14a is in contrast coupled to the busbar 2c of the energy storage device 1. In the DC voltage supply circuit 8 of FIG. 5, there is also a potential difference, which can be boosted by means of the boost converter 14 to a DC voltage $U_{ZK}$, between the feed node 14a and the anode collecting point of the half-bridge circuit 9 and hence the feed node 14b. The feed node 14a is connected via a diode 19 to the busbar 2c or, respectively, the neutral point connection of the electric machine 2, so that an undesirable short circuit cannot develop across the module switching branches 2 within the energy storage device 1. As a result, the potential, which in each case is currently the highest, of the busbar 2c or, respectively, of the input connections 3c of energy storage modules 3 of the energy storage device 1, which are coupled via module switching branches A to the feed node 14a, is applied to the feed node 14a of the DC voltage supply circuit 8 of FIG. 5.

The optional charging connections 8j and 8k can also be arranged on the feed node 14a instead of on the feed node 14b.

In the DC voltage supply circuits 8 of FIGS. 4 and 5, the diodes 18 respectively 19 can be replaced by a bridge switching circuit A.

Using the systems 300 and 400 of FIGS. 4 and 5, the module tap circuits 6 can be activated by the corresponding module coupling switches 17 of the module switching branches being closed at an operating point of the electric machine 2 which requires a small amount of machine voltage, for example at a low driving speed or at a resting state of an electrically operated vehicle. It is thereby ensured that the output voltage of the module tap circuit 6 cannot fall below the voltage of an individual energy storage module 3. In the charging mode, i.e. when the charging circuit 30 or, respectively, 40 is activated in the so-called range extender mode, the module coupling switches 17 of the module switching branches A can be disabled; thus enabling the output voltage of the module tap circuit 6 to also be negative.

All switching elements of the specified circuit arrangements can comprise power semiconductor switches, for example normal-blocking or normal-conducting N- or P-channel MOSFET switches or corresponding IGBT switches. When using power semiconductor switches having a defined and sufficient reverse blocking capability, the corresponding series circuits comprising diodes can be omitted.

Figure 7:
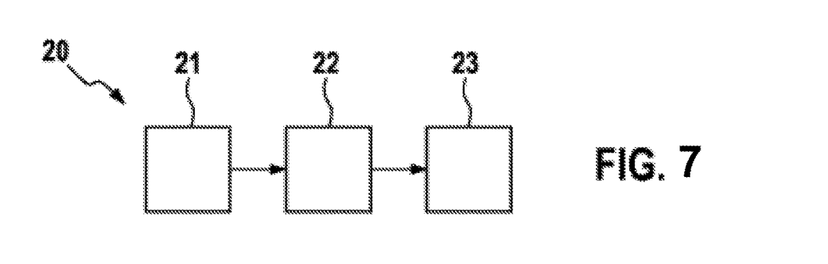
FIG. 7 shows a schematic depiction of a method for providing a DC voltage from an energy storage device according to a further embodiment of the present invention.

FIG. 7 shows a schematic depiction of a method for providing a DC voltage from an energy storage device, in particular an energy storage device 1 as described in connection with the FIGS. 1 to 6 and 8 to 9. The method 20 can, for example, be used for providing a DC voltage from an energy storage device 1 of an electrically operated vehicle comprising an electrical drive system 200, 300 or 400 of FIG. 3, 4 or 5, in particular for a DC voltage on-board power supply of the vehicle.

In step 21, the output voltage of the energy supply branches Z at the output connections 1a, 1b of the energy storage device 1 can initially be ascertained. As a function of the ascertained output voltage, a switchable coupling of the first input connection 3c of the energy storage cell module 5 of at least one energy storage module 3 of one of the energy supply branches Z to the first feed node 14a can then take place; and in step 23, a switchable coupling of the second input connection 3d of the energy storage cell module 5 of the at least one energy storage module 3 to the second feed node 14b can take place. The steps 22 and 23 are particularly then carried out if the output voltage which was ascertained is less than the maximum output voltage of a single energy storage module.

The invention claimed is:

1. A system (200; 300; 400) comprising an energy storage device (1) and a DC voltage supply circuit (8), wherein the energy storage device (1) has at least two energy supply branches (Z) which are each coupled, at a first output, to at least one output connection (1a, 1b) of the energy storage device (1) for generating an AC voltage at the at least one output connections (1a, 1b) and, at a second output, to a common busbar (2c), wherein each of the at least two energy supply branches (Z) has a multiplicity of energy storage modules (3) connected in series, which each comprise:
   an energy storage cell module (5), which has at least one energy storage cell (5a, 5k); and
   a coupling device (7) comprising a coupling bridge circuit comprising coupling elements (7a, 7b, 7c, 7d), wherein the coupling elements (7a, 7b, 7c, 7d) are designed to switch the energy storage cell module (5) selectively into the corresponding of at least two energy supply branches (Z) or to bypass said energy storage cell module in the at least two energy supply branches (Z), and wherein the DC voltage supply circuit (8) has:
   a bridge circuit (9) comprising a multiplicity of first feed connections (8a, 8b, 8c), which are each coupled to one of the at least one output connections (1a, 1b) of the energy storage device (1);
   two feed nodes (14a, 14b), of which at least one is coupled to the bridge circuit (9); and
   a module tap circuit (6), which has at least two module switching branches (A) comprising a commutation diode (16), wherein one of the at least two module switching branches (A) connects a first input connection (3c) of the energy storage cell module (5) of at least one energy storage module (3) of one of the at least two energy supply branches (Z) switchably to a first of the two feed nodes (14a), and another of the module switching branches (A) connects a second input connection (3d) of the energy storage cell module (5) of the at least one energy storage module (3) switchably to a second of the two feed nodes (14b).

2. The system (200; 300; 400) according to claim 1, wherein at least one of the at least two module switching branches (A) has, in addition to the commutation diode (16), a module coupling switch (17) connected in series with said commutation diode (16).

3. The system (200; 300; 400) according to claim 1, further comprising:
   a DC-to-DC converter (14) coupled between the first of the two feed nodes (14a) and the second of the two feed nodes (14b).

4. The system (200; 300; 400) according to claim 3, wherein the DC-to-DC converter (14) has a boost converter.

5. The system (200; 300; 400) according to claim 3, wherein the DC-to-DC converter (14) has a forward converter.

6. The system (200; 300; 400) according to claim 1, wherein a DC voltage supply circuit (8) has two charging circuit connections (8j, 8k) and a charging circuit (30; 40)

which is coupled via the two charging circuit connections (8j, 8k) in series with the DC-to-DC converter (14), and wherein the charging circuit (30; 40) is designed to provide a charging DC voltage for the energy storage cell module (5) of the energy storage device (1).

7. The system (200; 300; 400) according to claim 1, wherein the bridge circuit (9) has a multiplicity of first bridge switching branches (A) comprising the diode (16) or a series circuit consisting of the diode (16) and a bridge coupling switch (17), which are each coupled between the two feed nodes (14a, 14b) connected to the bridge circuit (9) and one of the multiplicity of first feed connections (8a, 8b) or of second feed connections (8d; 8e).

8. The system (200; 300; 400) according to claim 1, wherein the bridge circuit (9) has a further first feed connection (8c)which is connected to a busbar (2c).

9. The system (200; 300; 400) according to claim 8, wherein the bridge circuit (9) has a further bridge switching branch (A) or a diode (18, 19), which connects the further first feed connection (8c) to one of the two feed nodes (14a; 14b).

10. The system (200; 300; 400) according to claim 8, wherein the bridge circuit (9) has a further bridge switching branch (A) or a diode (18, 19), which connects the further second feed connection (8f) to one of the two feed nodes (14a; 14b).

11. The system (200; 300; 400) according to claim 1, wherein the bridge circuit (9) has a multiplicity of first feed connections (8a, 8b, 8c) as well as a multiplicity of second feed connections (8d, 8e, 8f), which each are coupled to one of the at least one output connections (1a, 1b) or to a busbar (2c) of the energy storage device (1).

12. The system (200; 300; 400) according to claim 11, wherein the bridge circuit (9) has a multiplicity of first bridge switching branches (A) and a multiplicity of second bridge switching branches (A) each comprising a second diode (16) or a series circuit consisting of a second diode (16) and a bridge coupling switch (17), wherein the first bridge switching branches (A) are each connected between one of the multiplicity of the first feed connections (8a; 8b; 8c) and the first of the two feed nodes (14a), and the second bridge switching branches (A) are each connected between one of the multiplicity of the second feed connections (8d; 8e; 8f) and the second of the two feed node (14b).

13. The system (200; 300; 400) according to claim 1, wherein the at least two module switching branches (A) connect the energy storage cell module (5) of the energy storage module (3), which lies in the closest proximity to a busbar (2c), of one or a plurality of the at least two energy supply branches (Z) switchably to the first or, respectively, second of the two feed nodes (14a, 14b).

14. The system (200; 300; 400) according to claim 1, further comprising:
an n-phase electric machine (2) comprising n phase connections, which is coupled to the at least one output connections (1a, 1b, 1c) of the energy storage device (1), wherein n≥1.

15. The system (200; 300; 400) according to claim 14, wherein the n-phase electric machine (2) has a winding neutral point which is fed out of said machine, and wherein the winding neutral point is connected to a busbar (2c).

16. The system (200; 300; 400) according to claim 1, wherein the DC voltage supply circuit (8) has two charging circuit connections (8j, 8k) and a charging circuit (30; 40) which is coupled via the two charging circuit connections (8j, 8k) directly to the two feed nodes (14a, 14b), and wherein the charging circuit (30; 40) is designed to provide a charging DC voltage for the energy storage cell module (5) of the energy storage device (1).

17. The system (200; 300; 400) according to claim 1, wherein the bridge circuit (9) has a further second feed connection (8f) which is connected to a busbar (2c).

18. A method (20) for providing a DC voltage from a system (200; 300; 400) comprising an energy storage device (1) and a DC voltage supply circuit (8), wherein the energy storage device (1) has at least two energy supply branches (Z) which are each coupled, at a first output, to at least one output connection (1a, 1b) of the energy storage device (1) for generating an AC voltage at the at least one output connections (1a, 1b) and, at a second output, to a common busbar (2c), wherein each of the at least two energy supply branches (Z) has a multiplicity of energy storage modules (3) connected in series, which each comprise an energy storage cell module (5), which has at least one energy storage cell (5a, 5k), a coupling device (7) comprising a coupling bridge circuit comprising coupling elements (7a, 7b, 7c, 7d), wherein the coupling elements (7a, 7b, 7c, 7d) are designed to switch the energy storage cell module (5) selectively into the corresponding of the at least two energy supply branches (Z) or to bypass said energy storage cell module in the at least two energy supply branches (Z), and wherein the DC voltage supply circuit (8) has a bridge circuit (9) comprising a multiplicity of first feed connections (8a, 8b, 8c), which are each coupled to one of the at least one output connections (1a, 1b) of the energy storage device (1), two feed nodes (14a, 14b), of which at least one is coupled to the bridge circuit (9), and a module tap circuit (6), which has at least two module switching branches (A) comprising a commutation diode (16), wherein one of the at least two module switching branches (A) connects a first input connection (3c) of the energy storage cell module (5) of at least one energy storage module (3) of one of the at least two energy supply branches (Z) switchably to a first of the two feed nodes (14a), and another of the module switching branches (A) connects a second input connection (3d) of the energy storage cell module (5) of the at least one energy storage module (3) switchably to a second of the two feed nodes (14b), the method comprising the steps:

ascertaining (21) an output voltage of the at least two energy supply branches (Z) at output connections (1a, 1b) of the energy storage device (1); and switchably coupling (22) the first input connection (3c) of the energy storage cell module (5) of at least one energy storage module (3) of one of the at least two energy supply branches (Z) to the first of the two feed nodes (14a) and switchably coupling (23) the second input connection (3d) of the energy storage cell module (5) of the at least one energy storage module (3) to the second of the two feed node (14b) in the event that the ascertained output voltage is less than the maximum output voltage of a single of the multiplicity of energy storage modules (3).

* * * * *